United States Patent [19]
Tanzilli et al.

[11] Patent Number: 5,540,996
[45] Date of Patent: Jul. 30, 1996

[54] RIGIDIZED, LOW DENSITY, INSULATION

[75] Inventors: Richard A. Tanzilli; Joseph J. Gebhardt, both of Malvern; Richard M. Fenton, Hatboro; James C. Kreitz, Jr., Bechtelsville, all of Pa.

[73] Assignee: The United States of America as represented by the Secretary of The Air Force, Washington, D.C.

[21] Appl. No.: 534,453

[22] Filed: Aug. 23, 1983

[51] Int. Cl.$^6$ .................. B32B 9/00; B32B 5/18
[52] U.S. Cl. .................. 428/408; 428/158; 428/159; 428/160; 428/920; 428/336; 428/698; 428/334; 343/18 E
[58] Field of Search .................. 428/158, 159, 428/160, 408, 920; 343/18 E

[56] References Cited

U.S. PATENT DOCUMENTS

| | | | |
|---|---|---|---|
| 3,573,153 | 3/1971 | Ryan, Jr. | 428/159 |
| 3,637,423 | 1/1972 | Sestrich | 428/408 X |
| 3,810,963 | 5/1974 | Benton et al. | 264/29 |
| 3,830,740 | 8/1974 | Amagi et al. | 252/62 |
| 4,268,562 | 5/1981 | Bacon et al. | 428/113 |
| 4,442,165 | 4/1984 | Gebhardt et al. | 428/408 X |

OTHER PUBLICATIONS

Hackh's Chemical Dictionary, Fourth Edition, Revised And Edited By J. Grant, McGraw–Hill Book Co., New York, 1969, pp. 232–233.
McGraw–Hill Encyclopedia Of Science & Technology, 5th Edition, McGraw–Hill Book Co., New York, 1982, vol. 11, p. 757.

*Primary Examiner*—Charles T. Jordan
*Assistant Examiner*—John R. Hardee
*Attorney, Agent, or Firm*—Charles E. Bricker; Thomas L. Kundert

[57] ABSTRACT

A thermal insulating device for use as the exterior coating of a space vehicle which consists essentially of a rigid carbon-carbon foam having an elastomeric foam bonded to the rear surface thereof and having a chemically vapor deposited coating applied to the front and side surfaces thereof.

6 Claims, 1 Drawing Sheet

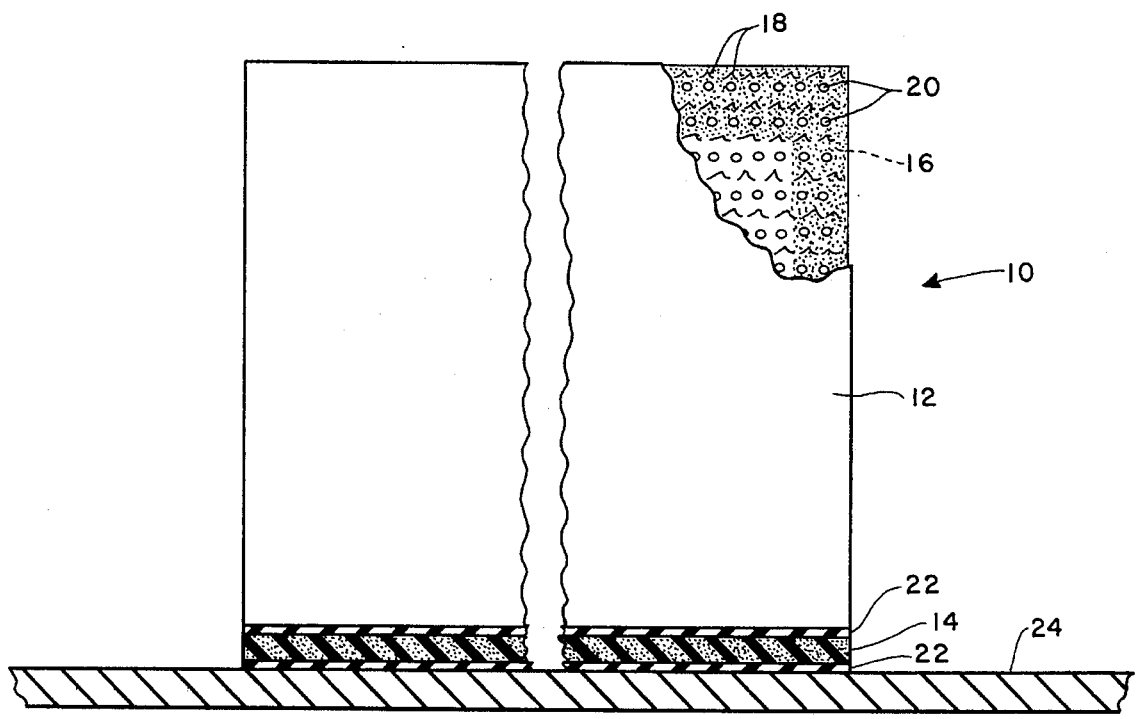

RIGIDIZED, LOW DENSITY, INSULATION

RIGHTS OF THE GOVERNMENT

The invention described herein may be manufactured and used by or for the Government of the United States for all governmental purposes without the payment of any royalty.

BACKGROUND OF THE INVENTION

Most satellites which operate in earth orbit require some form of enrironmental control to maintain a thermal balance between the satellite components and the extremes of the low temperature space background and the radiative flux from the sun. These satellites employ a variety of standard techniques including thermal control coatings, radiators and multilayer insulation (MLI) to achieve this thermal balance. These thermal control systems utilize a variety of materials depending upon application and configuration but they generally have similar properties of lightweight, low outgassing, and high UV stability. Consequently, most of the subsystems have not been designed with any need for very high temperature stability.

Rigid low-density ceramic insulation can be used in areas requiring structural support over a span where flexible insulating materials may cause dynamic load or flutter problems. The insulation characteristic of rigid insulation foams is proportional to thickness. Rigid foam can never completely replace multilayer insulation because to have equal insulation capability, the thickness of such rigid foam must be quite large. There are, however, areas of space vehicles having complex contours that are difficult to wrap using the multilayer insulation, where the rigid foam may be molded to fit.

With the advent of ground and spaceborne High Energy Laser (HEL) threats, most of the standard materials and techniques commonly used become vulnerable to severe degradation resulting from the high flux and fluence levels. As a result, active and passive countermeasures such as evasive actions or higher temperature materials must be used to withstand or avoid this new environment.

It is an object of the present invention to provide an improved rigid, low-density insulation material.

Other objects and advantages of the present invention will be apparent to those skilled in the art.

SUMMARY OF THE INVENTION

In accordance with the present invention there is provided a thermal insulating device adapted for use as the exterior coating of a space vehicle which consists essentially of a rigid carbon-carbon foam having an elastomeric foam pad bonded to the rear surface thereof and having a chemically vapor deposited coating, as hereinafter defined, applied to the front and side surfaces thereof.

BRIEF DESCRIPTION OF THE DRAWING

The figure is a cross-section of an embodiment of the invention

DESCRIPTION OF THE PREFERRED EMBODIMENTS

Referring to the drawing, the thermal insulating device of the present invention is designated generally by the reference numeral 10. The device 10 consists essentially of a rigid layer 12 of carbon-carbon foam, an elastomeric foam pad 14 bonded to the rear surface of the carbon-carbon layer 12, and a chemically vapor deposited coating 16.

The rigid carbon-carbon foam 12 initially consists of a hydrocarbon resin, carbon fibers and carbon microspheres, including carbonizable microspheres, a representative few fibers and microspheres being indicated at 18 and 20, respectively. The rigid foam 12 is prepared by admixing carbon fibers 18 and hollow spheres 20 of carbon or a carbonizable resin with a polymerizable or curable organic resin binder to prepare a mixture wherein the fibers 18 and the spheres 20 are uniformly dispersed in the binder. The mixture is molded under pressure into a compact configuration, then the binder is cured to form a self-supporting structure. This structure is then heated to convert the binder, and if necessary the spheres, to carbon. Following carbonization, a surface coating is applied to the front and side surfaces of the foam 12 and the elastomeric foam pad 14 is bonded to the rear surface.

Generally, the resin providing the binder for the fibers 18 and the microspheres 20 may be in either a liquid or finely divided solid form. The quantity of binder may vary from about 10 to about 50 weight percent. Satisfactory results may be achieved using high carbon-yielding resins such as epoxies; aldehydes, e.g., furfurylaldehyde and phenolformaldehyde; alcohols, e.g., partially polymerized furfuryl alcohol and tetrahydrofurfuryl alcohol; pitches of coal tar, vegetable and petroleum origin; pyrrolidones; polyphenylenes; polyacrylonitrile and copolymers of vinylidene chloride-acrylonitrile; and the like. When using the binders in liquid form a suitable evaporative solvent such as acetone or xylene may be employed to provide the proper viscosity for the mixture. Also, a catalyst for promoting polymerization of the binder may be employed. Catalysts suitable for use with the above resins are well known in the art. With the binder in solid form a wetting agent such as acetone or furfuryl alcohol may be added to facilitate processing the mixture.

The microspheres 20 may be carbonized prior to forming the mixture with the resin binder and the fibers, or they may be converted to carbon along with the resin. The microspheres may initially be made of carbonizable resins such as phenolics, alkyds, acrylics, indenes, or the like. The quantity of the microspheres can range from about 50 to about 85 weight percent. Normally, commercially available microspheres in a size range of 5 to 300 microns with a wall thickness of about 2 to 10 microns can be employed. Preferably, the microspheres are carbonized prior to incorporation into the foam of this invention, have an average diameter of about 200 microns, a wall thickness of about 3–8 microns and a size range of about ±25 microns.

The fibers 18 are carbon or graphite fibers, preferably the latter, made by carbonizing precursor yarn such as rayon, polyacrylonitrile or pitch. Generally, carbon, including graphite, fibers are available commercially with a fiber diameter of about 6 to 10 microns in the form of yarns or tows containing 1000 to 500,000 filaments per strand. For use in the present invention, the fibers are chopped or otherwise reduced in length to an average length of about 40 to 60 mils. The quantity of the fibers can range from about 5 to about 30 weight percent.

The mixture of binder resin, microspheres and fibers is compacted to a thickness of about 0.25 to 3.00 inch under a pressure of about 10 to 100 psi and then heated at an elevated temperature below the curing temperature of the resin for a time sufficient to remove the aforesaid solvent or wetting agent. The binder resin is then cured at a suitable curing temperature for a suitable time. The resulting rigid foam is carbonized at a temperature in the approximate range of 800° to 1100° C. in an inert atmosphere of argon, nitrogen, helium, or the like. Preferably, the carbonizing cycle employs a slow temperature increase, e.g., 10°–15° C. per hour, and a duration of about 3 or more days depending upon the size of the foam.

The coating 16 is a chemically vapor deposited coating. The coating 16 may be pyrolytic carbon formed by the decomposition of a hydrocarbon gas, such as methane, under controlled conditions known in the art. A pyrolytic carbon coating 16 eliminates dusting of the foam while being thin enough to retain the intrinsic absorbance/emittance ratio of the foam at approximately 1.0. Alternatively, silicon nitride may be vapor deposited on the foam to provide a range of $\alpha_s/\epsilon_H$ and $\alpha_L/\epsilon_H$ ratios. For example a silicon nitride coating would significantly reduce the net absorbed energy from a carbon dioxide laser due to this materials high intrinsic reflection in the 9 to 11 micron range.

After depositing the surface coating 16 onto the rigid foam 12 the backside of the foam may be machined to a suitable configuration, i.e., flat, curved, etc. The elastomeric foam pad 14 is thereafter joined to the rigid foam 12 using a suitable adhesive 22. The foam pad 14 is preferably a skin free, very tight closed cell foam with a density of about 16 pounds per cubic foot, and capable of withstanding temperatures of up to about 350° F. without decomposition. The foam pad 14 is produced in a loaf or panel form using a fluorinated elastomer, a silicone elastomer, a urethane elastomer or the like, then slit or skived to a desired thickness in the range of 60 to 200 mils. The adhesive 22 used to join together the elastomeric foam pad 14 and the rigid foam 12 may also be used to attach the device 10 to the skin 24 of the space vehicle.

Various modifications may be made to the present invention without departing from the spirit thereof or the scope of the appended claims.

We claim:

1. A thermal insulating device adapted for use as the exterior coating of a space vehicle which consists essentially of a rigid carbon-carbon foam having an elastomeric foam pad bonded to the rear surface thereof and having a chemically deposited coating, selected from the group consisting of pyrolytic carbon and silicon nitride, applied to the front and side surfaces thereof.

2. The device of claim 1 wherein said rigid carbon-carbon foam contains a plurality of carbon fibers.

3. The device of claim 1 wherein said vapor deposited coating is pyrolytic carbon.

4. The device of claim 1 wherein said vapor deposited coating is silicon nitride.

5. The device of claim 1 wherein the thickness of said rigid foam is in the approximate range of 0.25 to 3.0 inch.

6. The device of claim 1 wherein the thickness of said elastomeric foam pad is in the approximate range of 60 to 120 mils.

* * * * *